Figure 1:
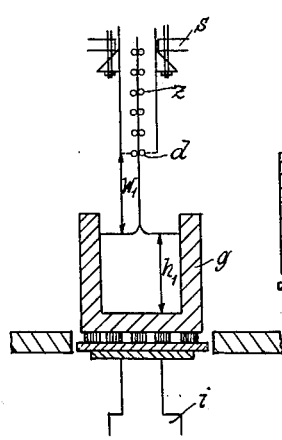

Dec. 27, 1932. B. ENGELS 1,892,459
PROCESS FOR DRAWING A GLASS BAND FROM THE SURFACE OF THE MOLTEN GLASS METAL
Filed Nov. 6, 1931

INVENTOR
BERNHARD ENGELS
BY Dorsey & Cole
ATTORNEYS

Patented Dec. 27, 1932

1,892,459

UNITED STATES PATENT OFFICE

BERNHARD ENGELS, OF WALDENBURG-ALTWASSER, GERMANY

PROCESS FOR DRAWING A GLASS BAND FROM THE SURFACE OF THE MOLTEN GLASS METAL

Application filed November 6, 1931, Serial No. 573,491, and in Germany November 7, 1930.

The present invention relates to a mechanical production of flat-glass-plates by drawing a glass band from the free surface of the molten metal.

Until now this was done by keeping constant the distance between the bottom of the smelting pot or drawing-cuvette and the surface of the metal, i. e. the position of the glass surface to the drawing-apparatus, by allowing a constant flow of fresh glass to pass in uniform quantity to the drawing-cuvette. But this requires great quantities of glass to be ready for the actual manufacturing process, and as these cannot be kept permanently in uniform temperature and condition, they are the cause of faults which affect the quality of the product.

In order to prevent these unavoidable faults occurring through having to keep ready such great quantities of glass, trials have been made to draw glass molten in the pot, viz. especially refined glass, directly from the pot in which it was molten or out of special drawing-cuvettes, putting up with the disadvantage of always having to begin anew a glass plate and of the unavoidable loss connected therewith.

But it was found that useful glass plates could not be made, because in consequence of the continual change of the distance between the glass surface and the drawing apparatus, even with the arrangement of a fixed drawing-apparatus, caused by the sinking of the glass-surface in the drawing-vessel, the width and thickness of the glass band drawn out always changed.

These drawbacks of the processes hitherto used are now done away with according to the present invention firstly by not having to add any glass to the filled pot or drawing-vessel during the drawing-process, so that the glass band produced is formed only out of the contents of the pot or drawing-vessel, and further, by keeping the distance between the free surface of the composition in the pot or drawing-vessel and the actual drawing-apparatus, especially the pair of drawing-rollers of the drawing-apparatus which come into contact with the glass band through reciprocal movement of the drawing-vessel and the drawing-apparatus, i. e. either by uniformly raising the drawing-vessel or by uniformly lowering the drawing apparatus, uniform during the whole drawing-process.

Figure 2:
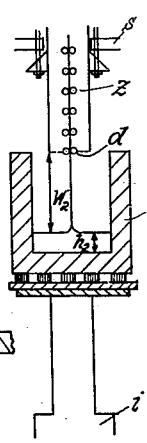
Figure 3:
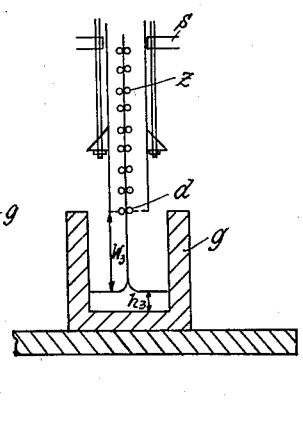

Figs. 1, 2 and 3 of the accompanying drawing are showing two forms of an apparatus for the process according to the present invention.

According to Figs. 1 and 2 a pot $g$ filled with glass, is used for forming the glass band, the pot being closed from all sides and having no access. This pot $g$ is arranged below the drawing-shaft $z$ of a glass drawing-machine. The glass plate is lifted out in the known manner and conducted between the rollers $d$ of the drawing-apparatus. The withdrawal of the glass plate would of course lower the glass level in the pot $g$, whereby the height $h^1$ would get smaller and the height $w^1$ greater. But the alteration of the height $w^1$ would affect the drawing-process and the quality of the glass plate, for which reason, according to this invention, the distance $w^1$ should always be kept constant during the drawing-process. This is obtained for instance by means of a lifting-apparatus $i$ which raises the glass pot uniformly. Fig. 1 shows the pot in its initial position, and Fig. 2 shows it in its raised position. Fig. 2 also shows that the height $w^2$ has remained the same as height $w^1$, while height $h^1$ has become less.

In form 3 (Fig. 3) the same effect is obtained by pot $g$ remaining at rest, while the drawing-shaft $z$ is lowered with uniform speed. In this case also height $w^3$ remains constant while height $h^3$ gets less.

I claim:—

The hereinbefore described method of drawing glass in selected form from a bath of molten glass exhausted in the drawing, which comprises drawing the glass upwardly in the selected form by traction exerted thereon and maintaining constant the distance between the point of application of the traction and the surface of the bath by a relative movement between the traction means and the container for the bath of glass.

BERNHARD ENGELS.